(12) United States Patent
Olah-Reiken et al.

(10) Patent No.: US 11,288,868 B2
(45) Date of Patent: Mar. 29, 2022

(54) SIMULATED REALITY ADAPTIVE USER SPACE

(71) Applicant: Foretell Studios, LLC, New York, NY (US)

(72) Inventors: Howard Olah-Reiken, Hoboken, NJ (US); Lyron L. Bentovim, Demarest, NJ (US)

(73) Assignee: Foretell Studios, LLC, New York, NY (US)

( * ) Notice: Subject to any disclaimer, the term of this patent is extended or adjusted under 35 U.S.C. 154(b) by 0 days.

(21) Appl. No.: 16/939,504

(22) Filed: Jul. 27, 2020

(65) Prior Publication Data
US 2021/0027537 A1 Jan. 28, 2021

Related U.S. Application Data

(60) Provisional application No. 62/878,884, filed on Jul. 26, 2019.

(51) Int. Cl.
*G06T 19/00* (2011.01)
*G06T 19/20* (2011.01)

(52) U.S. Cl.
CPC ............ *G06T 19/003* (2013.01); *G06T 19/20* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 5,583,977 A | * | 12/1996 | Seidl | G06F 3/04845 345/619 |
| 2018/0061127 A1 | | 3/2018 | Gullicksen | |
| 2019/0043259 A1 | * | 2/2019 | Wang | G06F 3/012 |
| 2019/0164343 A1 | * | 5/2019 | Bailey | G06F 1/163 |
| 2020/0294311 A1 | * | 9/2020 | Holz | G06T 19/20 |
| 2020/0342625 A1 | | 10/2020 | Lerman | |
| 2020/0394840 A1 | | 12/2020 | Coghlan et al. | |

* cited by examiner

*Primary Examiner* — Jennifer Mehmood
*Assistant Examiner* — Jed-Justin Imperial
(74) *Attorney, Agent, or Firm* — Fox Rothschild LLP (57) ABSTRACT

Disclosed herein is a simulated reality (SR) display system with an adjustable perspective. A simulated reality display system with an adaptable user space can receive a real world layout corresponding to a physical space in which the SR environment will be displayed to the user. Using the real world layout, a default user space can be adapted to conform to one or more aspects of the physical space forming an adjusted user space. Assets of an SR layer can be repositioned relative to the adjusted user space, with the SR layer defining a layout of a plurality of assets in the SR environment. The SR environment can be displayed on the display device, in accordance with the SR layer, allowing the user to safely move around the user space to explore the SR environment without undesirable interactions with the one or more aspects of the physical space.

19 Claims, 7 Drawing Sheets

SIMULATED REALITY ADAPTIVE USER SPACE

CROSS-REFERENCE TO RELATED APPLICATION

This application claims priority to U.S. Provisional Application No. 62/878,884, filed on Jul. 26, 2019, the disclosure of which is incorporated by reference herein in its entirety.

FIELD

The present invention relates to systems and methods for positioning, orienting and scaling user movable spaces in simulated reality environment.

BACKGROUND

A simulated reality (SR) experience provides a three-dimensional (3D) representation of a real or simulated world. Simulated reality encompasses both augmented reality and virtual reality. In an augmented reality experience, a user device receives live image content of a real world environment, and an augmented reality image object is overlaid on the real world environment for display. In a virtual reality experience, a user device receives virtual reality image content of a virtual reality environment, and virtual reality image objects are overlaid on the virtual reality environment for display.

Current methods of mapping a simulated reality environment to a real world environment use user spaces that are set up per device and that are provided to keep users safe during their usage of the system. Such user spaces are then used by all SR experiences on that particular device. There is a need for a method of adaptation of user spaces to different and varying simulated reality environments, irrespective of a real world layout and/or device.

The information included in this Background section of the specification, including any references cited herein and any description or discussion thereof, is included for technical reference purposes only and is not to be regarded subject matter by which the scope of the invention as defined in the claims is to be bound.

SUMMARY

Disclosed herein is a simulated reality (SR) display system with an adjustable perspective. The simulated reality display system includes a viewing device suitable for displaying a simulated reality SR environment. The SR system receives a real world layout 80 defining the physical features and/or region around the user and adjusts a user space to conform to one or more aspects of the real world layout forming an adjusted user space. The SR system also assigns one or more assets to an SR layer. The SR system determines determine a position of the user space relative to the SR layer. The SR layer defines a layout of the SR environment. The SR system displays the SR environment on the display device allowing the user to move around the user space to explore the SR environment.

This Summary is provided to introduce a selection of concepts in a simplified form that are further described below in the Specification. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Systems and methods are disclosed herein suitable for displaying SR environments. Disclosed herein is a SR display system with an adaptive user space that is positioned relative to an SR layer (that defines a layout of the SR environment), where the adaptive user space allows a user to safely move around a real world layout while experiencing a SR environment. A SR environment is also referred to herein as a SR experience. The system and methods also display SR assets relative to the user space and/or relative to a user's position and movements therein. The assets may comprise media assets and decorative assets. The media assets could be any of text, image, video, audio, 3D objects or other consumable information-based data. Decorative assets are similar in type to media assets, the difference being that role of the assets in the environments is more cosmetic than content intended to communicate some information and may include, without limitation, simulated walls, furniture, trees, or other objects.

The user space as disclosed herein includes a region in which the user can suitably move around a real world layout (i.e., a physical space in which the SR environment is displayed) with limited and/or no undesirable interference from the physical features therein (e.g., without bumping into furniture, walls, or other objects), while experiencing an SR environment. Examples of such physical features can include, for example, chairs, desks, walls, cabinets, etc. in a real world layout of an office setting; rocks, vegetation, drop offs, hills, etc. in a real world layout of an outdoors natural setting; or other features in other suitable real world settings. While experiencing an SR environment using an SR viewing device, the user may be distracted or unable to see the real world physical features and/or region. As such, defining a user space delineating an area that the user can move around in while avoiding or limiting undesirable interference with certain physical features provides increased safety while using the system. The user space can be defined taking into account factors, such as, user safety, identity and/or location of features that can be interacted with (e.g., touched), identity and/or location of features that cannot be interacted with, or the like. However, providing a default user space (for a particular SR environment) may limit the full utilization of the SR environment when applying the SR environment in different settings or physical spaces. As such, adaptability between the SR environment, the real world layout, and the user space is disclosed herein.

The simulated reality display system includes a viewing device suitable for displaying a simulated reality SR environment. The SR system receives a real world layout defining the physical features and/or region around the user and defines and/or adjusts a user space to conform to one or more aspects of the real world layout. The SR system also assigns one or more assets to an SR layer, at least some of which are positioned relative to the user space. In this manner, the SR system determines a layout of the SR layer user space relative to the user space. The SR system displays the SR environment on the display device allowing the user to move around the user space to safely explore the SR environment created using the SR layer. The layout of an SR layer may define the position of the SR assets that makeup the SR environment or SR environments as experienced by the user (optionally, in relation to a user space). It should be noted that a single SR layer may define the position of the SR assets in one or more interconnected physical spaces in an SR environment, each having a user space. Alternatively and/or additionally, each physical space may have its own SR layer and user space.

Simulated reality systems can be displayed on two-dimensional (2D) devices such as computer screens, mobile devices, or other suitable 2D displays. Simulated reality systems can also be displayed in 3D such as on a 3D display or hologram. Examples of simulated reality include virtual reality (VR), augmented reality (AR), and traditional 3D representations on a 2D display. Simulated reality systems immerse users in environments that are either partially or entirely simulated. In AR environments, users interact with real world information via input sensors on the device, providing a partially simulated environment. In VR environments, the user is fully immersed in a 3D simulated world. For example, VR environments can use hardware such as HTC Vive, Oculus Rift, and Oculus Quest.

Each type of SR system may have objects or assets that are simulations of (i.e., corresponds to) real world items, objects, places, people, or similar entities. The assets or conditions can also provide feedback through haptics, sound or other suitable methods. The SR layer may define the position of one or more SR assets in the SR environment to be displayed. For example, for displaying an SR environment in a room, the SR layer may provide the location of the SR assets in the room (e.g., simulations of furniture at various locations within the room, simulated walls overlaid over real walls, a door overlaid over at least part of a real door, etc.). At least some of the SR assets can have a fixed relationship with a user space of the SR layer, such that any modification in the user space causes a commensurate change in the position of such SR assets. In these systems, the SR layer is also associated with a default user space such that the user can physically move around within a defined area (the default user space) defined by some shape or boundaries such as a polygon. When the SR system receives a real world layout defining the physical features and/or region in which the SR environment will be displayed using the SR layer, the system first adapts the default user space to the received real world layout, and then can modify the positions of one or more of the SR assets in the SR layer according to their respective fixed positional relationship with the user space (i.e., maintaining their relative position with respect to the user space). For example, if an SR asset (e.g., a simulated chair) has position at a certain distance to the left of a user space in the SR layer, the SR asset is always positioned at that location irrespective of the configuration of the user space. In this manner, the SR layer may be mapped to a real world environment while defining a user space in which a user a safely move around. The position of the SR assets within the SR layer and relative to the user space can be stored as SR data by the system.

The simulated reality environment, including any SR objects or assets, may be displayed to the user (e.g., on a display of the mobile phone) from a perspective that correlates to the user's perspective relative to the SR environment. As the user moves through physical space, the user's position (and perspective) changes relative to the simulated reality environment based on the mapping of the simulated reality environment relative to the physical space. Moreover, the user space and the corresponding layout of the SR assets may be adapted in response to user's movement in a physical space.

A user may also interact with an SR environment by controlling the actions of a virtual being, also known as an "avatar." The avatar may be a visible and/or audible representation of the user in the simulated environment, and may represent the "body" (in any shape or form) of the user as s/he moves through the simulated environment. Avatars may be able to mimic the actions of real physical people (i.e., users) in a variety of ways, such as by looking in different directions, moving to different locations, entering buildings, handling objects, and even interacting with other avatars in the SR environment.

Figure 1:
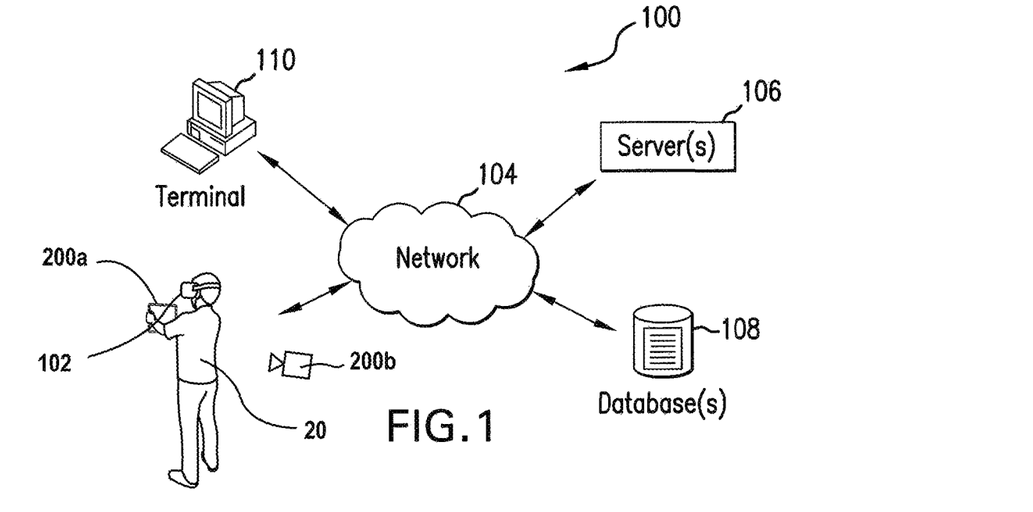
FIG. 1 is a diagram of a system for marker-based simulated reality positioning according to an embodiment.

Turning to the figures, systems and methods for presenting SR including an adaptable user space will now be discussed. FIG. 1 is a diagram of a simulated reality positioning system 100 for positioning simulated reality environment relative to one or more user spaces and/or real world surroundings, and for presenting SR environment content (e.g., assets) based on the relative positioning of the SR layer assets with respect to the user space. The user device 102 can be any of various types of computing devices, e.g., smart phones, tablet computers, desktop computers, laptop computers, set top boxes, gaming devices, wearable devices (e.g., SR glasses, smart watch, etc.), or the like. The user device 102 provides output to and receives input from a user. For example, the user device 102 may receive movement information related to the user and output positioning information and SR to a user. The simulated reality presentation can be displayed according to various suitable methods, for example, on a display screen of a user device 102, or through a separate headset, focal lens, or other suitable device that is communicatively coupled to the user device 102. The type and number of user devices 102 may vary as desired.

The user device 102 may include a camera that captures image content. For example, the camera may be used to define the real world environment to allow the SR environment to be mapped to the physical environment. The user device 102 can communicate with one or more servers 106 via a network 104. The user device 102 can communicate with the network 104, for example, by way of a wireless access point, a cellular cite, and/or by other suitable access points, such as Bluetooth or other connections.

The user device 102 can have communication interfaces and/or sensors for detecting data that is indicative of a position or attribute of the user device 102. For example, the user device 102 can have a global positioning system (GPS) interface that communicates with a GPS satellite to receive information indicative of a geolocation of the user device 102. The user device 102 can have a compass, magnetometer, or other sensor for detecting or determining the heading of the user device 102. The user device 102 can have an accelerometer, e.g., comprising piezoelectric sensors, for detecting movement of the user device 102. The accelerometer can also indicate tilt of the user device 102, including its pitch, roll, and yaw and position and/or movement about its pitch, roll, and yaw axes. The user device 102 can have a barometric pressure sensor or other sensors for detecting an altitude of the user device 102. The user device 102 can have a wireless network communication interface and can be configured to detect the proximity of the user device 102 to a wireless access point.

The network 104 may be substantially any type or combination of types of communication system for transmitting data either through a wired or wireless mechanism (e.g., WiFi, Ethernet, Bluetooth, cellular data, or the like). In some embodiments, certain components in the system 100 may communicate via a first mode (e.g., Bluetooth) and others may communicate via a second mode (e.g., WiFi). Additionally, certain components may have multiple transmission mechanisms and be configured to communicate data in two or more manners. The configuration of the network 104 and communication mechanisms for each of the components may be varied as desired.

The server 106 includes one or more computing devices that process and execute information. The server 106 may include its own processing elements, memory components, and the like, and/or may be in communication with one or more external components (e.g., separate memory storage) (an example of computing elements that may be included in the server 106 is disclosed below with respect to FIG. 2). The server 106 may also include one or more server computers that are interconnected together via the network 104 or separate communication protocol. The server 106 may host and execute a number of the processes executed by the system 100.

The system 100 information such as SR data in one or more data stores 108. The stored SR data can be uploaded to the data store(s) 108 from one or more user devices 102 (e.g., by a SR creator). The stored SR data can include user space data (e.g., default user space configuration such as size, shape, etc.; one or more rules for adjusting the user space relative to a real-world environment, position of the user space relative to the physical space, specific location in a coordinate system or grid, associated SR layer, and the like), SR layer data (e.g., identification of various SR assets and their location(s) within the SR layer, relative positioning of SR assets with respect to the user space, associated default user space(s), and the like), etc., as discussed in more detail below. While FIG. 1 shows the data store 108 being a remote data store, (e.g., cloud-based database) communicatively coupled to the user device 102 and server 106 via network 104, in some embodiments, the database 108 can be stored in a local memory of the user device 102 and/or in a local memory of the server 106.

A managing terminal 110 can be communicatively coupled to the server 106 and/or the database 108 via network 104, for managing the system 100. For example, a manager of the system 100 can use terminal 110 to assign, modify, update, and/or confirm marker data associated with a simulated reality environment and simulated assets stored in the database 108.

Figure 2:
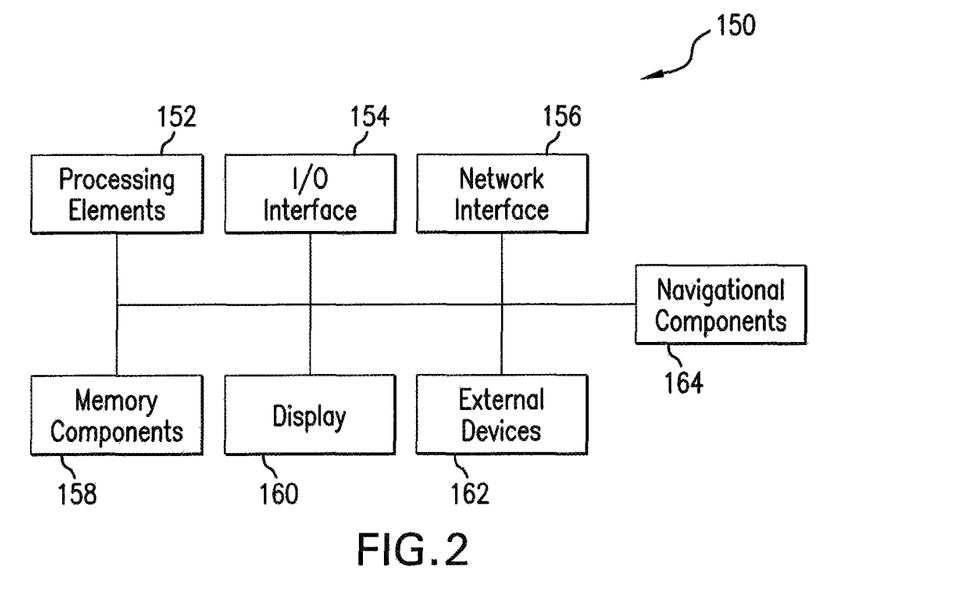
FIG. 2 is a simplified block diagram of a computing device that may be used with the system of FIG. 1.

A simplified block structure for a computing device 150 that may be used with the system 100 or integrated into one or more of the system 100 components is shown in FIG. 2. For example, the server 106, user device 102, managing terminal 110 and/or database 108 may include one or more of the components shown in FIG. 2 and use one or more of these components to execute one or more of the operations disclosed in methods 200 and 250. With reference to FIG. 2, the computing device 150 may include one or more processing elements 152, an input/output interface 154, a network interface 156, one or more memory components 158, a display 160, and one or more external devices 162. Each of the various components may be in communication with one another through one or more busses, wireless systems, or the like.

The one or more processing elements 152 may be substantially any electronic device capable of processing, receiving, and/or transmitting instructions. For example, the processing element(s) 152 may be a central processing unit, microprocessor, processor, or a microcomputer. Additionally, it should be noted that the processing element 152 might include more than one processing member. For example, a first processing element 152 may control a first set of components of the computing device 150 and a second processing element 152 may control a second set of components of the computing device 150, where the first and second processing elements 152 may or may not be in communication with each other, e.g., a graphics processor and a central processing unit which may be used to execute instructions in parallel and/or sequentially.

The memory components 158 are used by the computer 150 to store instructions for the processing element 152, as well as store data, such as asset data, user space data, location data, simulated reality layout mapping information, and the like. The memory components 158 may be, for example, non-volatile storage, a magnetic storage medium, optical storage medium, magneto-optical storage medium, read only memory, random access memory, erasable programmable memory, flash memory, or a combination of one or more types of memory components 158.

The display 160 may be separate from or integrated with the computing device 150. For example, for cases in which the computing device 150 is a smart phone or tablet computer, the display 160 may be integrated with the computing device 150 and in instances where the computing device 150 is a server or a desktop computer the display 160 may be separate from the computing device 150. The display 160 provides a visual output for the computing device 150 and may output one or more graphical user interfaces (GUIs). The display may be a liquid display screen, plasma screen, light emitting diode screen, cathode ray tube display, and so on. The display 160 may also function as an input device in addition to displaying output from the computing device 150 to enable a user to control, manipulate, and calibrate various components of the computing device 150. For example, the display 160 may include capacitive touch sensors, infrared touch sensors, resistive grid, or the like that may capture a user's input to the display 160.

The network interface 156 receives and transmits data to and from the computing device 150. The network interface 156 may transmit and send data to the network 104, other computing devices, or the like. For example, the network interface 156 may transmit data to and from other computing devices through the network 104, which may be a wireless network (Wi-Fi, Bluetooth, cellular network, etc.) or a wired network (Ethernet), or a combination thereof. In particular, the network 104 may be substantially any type of communication pathway between two or more computing devices. For example, the network interface 156 may include components that are wireless, wired (e.g., USB cable), or a combination thereof. Some examples of the network 104 include cellular data, Wi-Fi, Ethernet, Internet, Bluetooth, closed-loop network, and so on. The network 104 may include combinations of networking types and may be varied as desired.

The external devices 162 (e.g. 200*a*, 200*b*, etc. of FIG. 1) are one or more devices that can be used to provide various inputs to the computing device 150, e.g., a mouse, microphone, keyboard, trackpad, or the like. The external devices may be local or remote and may vary as desired. The external device can also be a camera that captures image content. The captured image content can be two-dimensional or three-dimensional. It is contemplated that more than one camera may be used. For example, the camera may be used to define the real world environment to allow the SR environment to be mapped to the physical real-world environment. The external devices can communicate with one or more servers 106 via a network 104. The external devices can communicate with the network 104, for example, by way of a wireless access point, a cellular cite, and/or by other suitable access points, such as Bluetooth or other connections.

The navigational components 164 can include motion and/or position sensors such as an accelerometer, gyroscope, inertial measurement unit, or the like.

The system may also include an input/output interface 154 that allows the computing device 150 to receive inputs from a user and provide output to the user. In some examples, this can be the same as user device 200*a*. But in other examples, the input/output interface 154 may include a capacitive touch screen, keyboard, mouse, camera, stylus, or the like. The type of devices that interact via the input/output interface 154 may be varied as desired. Additionally, the input/output interface 154 may be varied based on the type of computing device 150 used. Other computing devices 150 may include similar sensors and other input/output devices 154.

In several embodiments herein, a simulated reality environment may be mapped to a physical space such that a user positioned in physical space has a position relative to the simulated reality environment. The physical environment may be an indoor environment (e.g., an office, store, hallway, mall, hospital, classroom, etc.) or an outdoor environment (e.g., street, patio, market, fair grounds, etc.). In one example, the physical environment may have a physical floorplan and the simulated reality environment may have a corresponding simulated floorplan that maps to the physical floorplan. For example, the position of physical features (e.g., physical walls, floors, isles, trees, buildings, etc.) within a physical floorplan may have corresponding simulated features (e.g. simulated walls, floors, isles, buildings, etc.) within the simulated floorplan.

In some examples, the simulated reality layout may have the same dimensions as the physical space. For example, the simulated reality layout can be scaled, translated (repositioned), rotated, and the like in order to fit the physical space. In other examples, the simulated reality layout may be smaller or larger than the physical space. In some examples, multiple simulated reality layouts may be mapped to a single physical space.

Figure 6:
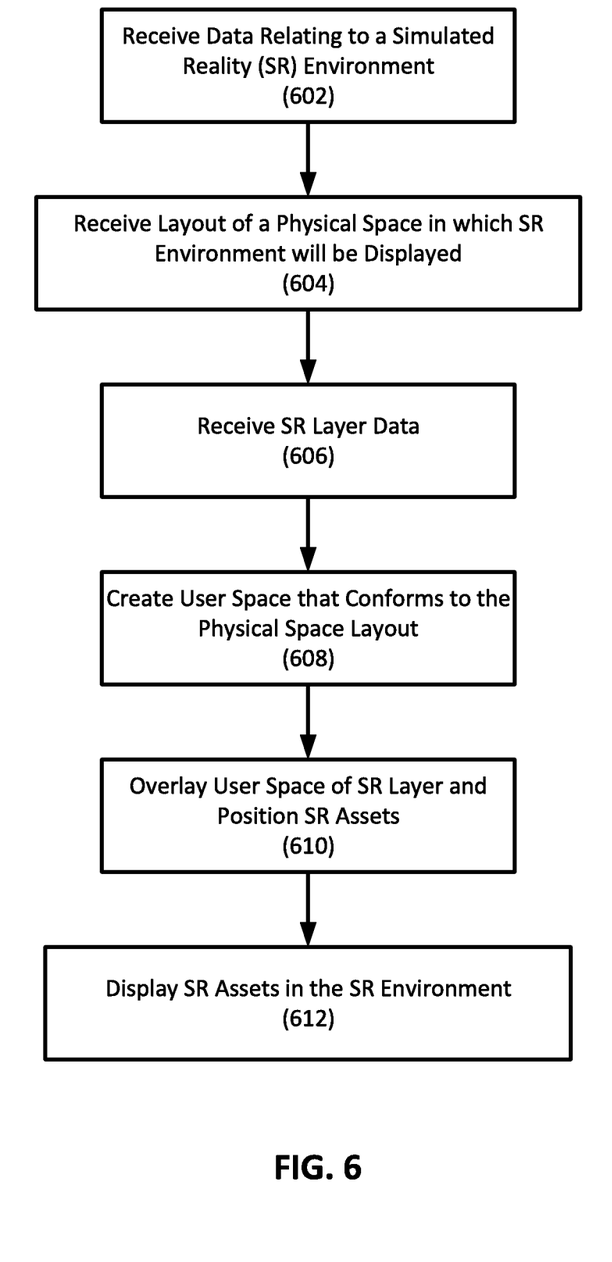
FIG. 6 is a flow chart illustrating an example method for presenting a SR environment to a user by generating an adaptive user space.

FIG. 6 is a flowchart illustrating a method for positioning simulated reality environment relative to one or more user spaces and/or real world surroundings. The method 600 may be carried out by the system disclosed in FIG. 1. The method 600 begins with operation 602 and data and/or information relating a simulated layer is received, determined, and/or created.

In some embodiments, SR data may be received (e.g., from a user or from an external server) and stored. SR data may include, without limitation, SR layer data and user space data. The SR data may be input by an administrator such as a creator of an SR environment. In several embodiments, the SR data and/or the user space data may only be altered by the administrator.

The SR layer data may include information such as, for example, the SR layer type (e.g., virtual reality or augmented reality), identification of one or more user spaces associated with the SR layer, SR assets and/or features associated with the SR layer (e.g., doors, walls, objects in the SR layer, etc.), interactions between users and SR assets, the layout of the SR layer (e.g., the position of the SR assets within the SR layer, positional relationship between one or more SR assets and one or more user spaces), or the like.

As discussed above, the SR data may also include user space data associated with an SR layer. For example, the user space data may define the size, shape, or other configuration of a default user space, information for positioning of a default user space in a physical space, one or more rules for adapting the default user space to a physical space, default user space identification (e.g., an identifier), or the like. The layout of an SR layer may define the position of the SR assets that makeup the SR environment or environments as experienced by the user, and may be positioned within a physical space using a location indicator or anchor (e.g., an already positioned user space, a marker, a physical component configured to provide location feedback, a mapping of a physical space, real world feature/objects, or the like). Examples of location indicators may include without limitation, physical objects/features in a real world environment (e.g., walls, windows, doors, trees, objects, locations, etc.), location feedback providing objects in a real world environment (e.g., markers, beacons, etc.), a mapping of a physical space in the real world environment (e.g., a coordinate system or a grid), etc., or combinations thereof.

The user space defines a region within which a user can move freely without safety concerns in a real-world layout while experiencing a SR environment (corresponding to the SR layer), and may be created by adapting a default user space to a real-world layout (i.e., a physical space). While the following description describes creation of a user space by adapting a default user space based on a layout of a physical space, the disclosure is not so limiting. The user space may be created by the system without the use of a default user space based on one or more rules for defining the user space (for e.g., rules similar to those used for adapting the default user space when applied to any arbitrary starting region in a physical space). Optionally, a user space may be created by a user. The user space may have any of various polygonal shapes, such as, for example, a rectangle, diamond, triangle, circle, etc. The user space may be two-dimensional (e.g., on a two-dimensional real-world layout) or three-dimensional (e.g., on a two-dimensional real-world layout including stairs).

In some embodiments, multiple user spaces may be associated with a SR layer. For example, different user spaces may be positioned at different locations within a physical space (or multiple physical spaces) relative to one another, each providing relative positioning of some or all of the assets within an SR layer. In this example, each user space may be customizable with respect to a physical space.

Referring back to FIG. 6, at 604, the system may receive a layout of a physical space in which the SR environment will be displayed. The layout of the physical space (i.e., the real world layout) allows the SR system to define parameters to adapt a default user space and/or create a user space suitable for the physical space in which the SR environment will be displayed. The system can receive the layout such that the system can interpret and/or define the physical features and/or region around a user. For example, the layout can include the meets and bounds of an indoor space (e.g., a room) and can include information (e.g., position, dimensions, identification) of objects such as furniture, physical features of the indoor space (e.g., doors, steps, etc.), and/or other obstacles around a user. Similarly, the layout can include information (e.g., position, dimensions, identification) relating to physical features and obstacles in an outdoor space (e.g., trees, steep drops, hills, vehicles, incline, etc.). The layout may include access ways or connections that connect separate portions of the SR environment created using separations. This separations (e.g. walls, roofs, etc.) and connections (e.g. doors, stairways, etc.) may be received as a part of the floor plan as discussed above.

The layout may be received by the system as a digital floorplan of an indoor space, a digital map of an outdoor space (e.g., a playground), etc., from a data store. Additionally and/or optionally, the layout may be received by the system as a captured image (for an image capture device) which may be processed by the system using any now or hereafter known methods to create the layout. Optionally, the system may receive an already processed image that includes the layout. In some embodiments, the layout may be received by the system as a user input. For example, a user may provide information (e.g., dimensions, objects, etc. of a physical space) received via a user device. Optionally, the user input may be captured and processed input from a hand held input device such as user device. Other suitable input devices can be used as well. It is also understood that these input methodologies can be used individually or in any suitable combination with one another.

At 606, the system may receive SR layer data for displaying a SR environment in the physical space. The SR environment is displayed by displaying one or more SR assets in the physical space at their respective positions, and the SR layers defines the positions of such SR assets with respect to the physical space. The SR layer can also define the position of a default user space within the physical space. As discussed above, the SR layer may be anchored with respect to a specific location indicator or anchor (e.g., marker, object that provides location feedback, mapping of the physical space etc.) within the physical space. Optionally, the user space may be anchored within the physical space (as described below), and the SR layer may be positioned according to the positioning of the user space.

At 608, the system may create a user space corresponding to the received layout. As discussed above, the system may create the user space by adapting a default user associated with an SR layer, by adapting an arbitrary area (e.g., a square of a fixed dimensions), and/or based on user instructions.

Optionally, the system may first position the default user space (or arbitrary area) with respect to the physical space (i.e., the real-world layout)—for example, when the SR layer is not anchored in the physical space. Examples of location indicators may include without limitation, physical objects/features in a real world environment (e.g., walls, windows, doors, trees, objects, locations, etc.), location feedback providing objects in a real world environment (e.g., markers, beacons, etc.), a mapping of a physical space in the real world environment (e.g., a coordinate system or a grid), etc., or combinations thereof.

Figure 3A:
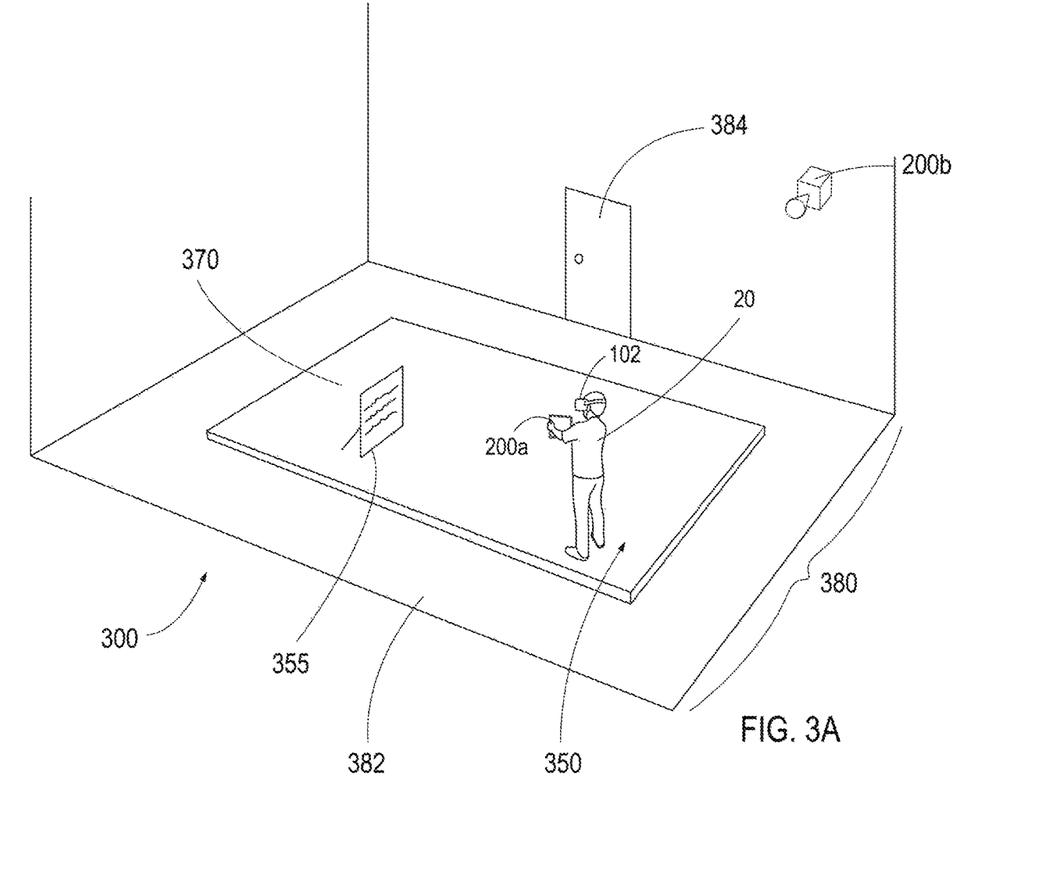
FIG. 3A is a schematic of a simulated reality system with a user space overlaid thereon.

The location and placement of the user space may be determined relative to a specific identifiable physical structure (e.g., a store, hallway, doorframe, window, walkway, etc.) or object in a physical space (e.g., with or without an intervening SR layer). The identifiable structure may be detectable by a camera. The identifiable object may be a 3D shape (e.g., square, triangle, diamond, polygon, hexagon, etc.), a commonly used object (e.g., a doorframe, door handle, picture frame, light switch, faucet, etc.), an object previously detected by the system (and with object information stored in a database), or the like. The identifiable structure may be fixed (e.g., non-movable, permanent, etc.) or repositionable (e.g., movable, temporary, etc.). For example, the identifiable object may be a doorframe that has a fixed location in the physical space. In the example where the identifiable object is repositionable, the identifiable object may be moved to various discrete locations throughout the surrounding physical environment. As discussed in more detail below, an identifiable object may act as an anchor to a user space (e.g., by having a position relative to the user space). In some embodiments, a fixed identifiable object may be desirable to maintain a constant anchor for a user space (and/or an SR layer) to fix the user space (and/or the SR layer) in the physical space. For example, as shown in FIG. 3A, the user space 375 may be positioned in the real world layout 380 corresponding to the room 382 at a certain distance from and/or at a certain orientation with respect to the door 384 in the room 382 (or any other physical feature or object in the room 382). a location indicator may be a component configured to provide a reference for positioning of a SR layer (i.e., various assets included in the SR layer) relative to a real world environment.

In some embodiments, a location indicator may be any physical component configured to provide location feedback. In such examples, the location indicator can be a localized indicator and/or a wide area indicator. For example, as discussed in more detail below, a localized location indicator may be one or more markers, beacon devices, and the like. These devices utilize line of sight or short range signals interacting with the user within the immediate area of the indicator. In some examples, the location indicator can be a wide area indicator. Wide area indicators can include devices such as WiFi routers, satellites, radios, and the like. These devices utilize the ability to communicate with the user from a distance. The user and the wide area indicator do not need to be in the same immediate area. In these embodiments, the SR layer may define a location of a various SR assets (e.g., an SR transition element), such that the SR assets have a position relative the location feedback provider.

In some embodiments, the location indicator may be a coordinate system, a grid, a layout of a physical environment, etc. (e.g., the layout of the physical space) that has a defined relationship to a real world environment. For example, a user space may be positioned relative to the physical space by a coordinate system or grid.

The user space may be adapted to the specific configuration of the physical space using one or more rules (discussed below in more detail). Adaptation of the user space may include for example, modifying one or more of the following of a default user space: size, shape, and/or dimensions (i.e., scaling), orientation (i.e., rotating), relocate (i.e., shifting), or the like, in order to conform to the metes and bounds of a physical space taking account various physical features, objects, etc. within the physical space. For example, if the default user space is a square that has a size less than that of a physical space that includes obstacles, the system may scale up the size of the user space while avoiding certain areas that include the obstacles.

Specifically, the system may adapt the user space to conform to the configuration of the physical space based on one or more rules such that a user can explore the SR environment safely while present/navigating a real world physical space. Examples of such rules may include, for example, allowed distances or tolerances from various types of objects and features (e.g., user has to stay at least 5 ft. from a wall, at least 10 ft. from a steep drop, 0.5 ft. from furniture, or the like); rules relating to whether or not a user can traverse one or more objects/physical features (e.g., a user can pass through a door but not a window, a user needs to stay on a sidewalk and only cross a road at allowed crossings); rules relating to overlaying of real world objects/ physical features to SR assets and/or allowed interactions real world objects/physical features (discussed below with respect to FIGS. 5A and 5B); rules relating to providing access ways between different portions of an SR environment (e.g., providing an access way that conforms to a door in a room to allow a user to navigate from one portion of the SR environment to another portion of the SR environment); rules relating to relocation of a user space from one physical space to another physical space as the user moves between the physical spaces (e.g., adapt the user space according to the current room in which a user is present while displaying the same assets in similar relative positions as a previous room location of the user); rules relating to orientation of the user space (e.g., adapt the user space to conform to a sloping hillside by changing the orientation of the user space accordingly), or the like.

Optionally, as discussed above a user may create a user space (and/or provide rules for creating a user space) via a user device. In some embodiments, the system may ask a user to verify that an automatically created user space is acceptable.

At 610, the system may overlay the user space over the received SR layer that will be used to create the SR environment, and position various SR assets on the SR layer. Optionally, at least some of the assets may have fixed positions relative to the user space that are adapted based on adjustments in the user space. One or more assets may have fixed positions within the SR layer which may not change based on adjustments to the user space. This allows the SR layer that defines the location of assets in the simulated world to position the SR assets according to the user space which is also correlated with the real world location.

As discussed above, the SR assets have positions relative to the user space. The relative position may be in the form of specific relative coordinates (e.g., X distance from a center of the user space in a Y direction) and/or relative regions (e.g., anywhere in the left quadrant of the user space). In some embodiments, if the SR assets are positioned on the SR layer and a default user space has a first location/ size/orientation/etc. with respect to the SR layer, any change in the default user space leads to a corresponding change in the location of such SR assets.

Additionally, and/or alternatively, the SR assets may also be resized and/or reoriented based on the adjustments made to the user space. For example, if a default user space is made smaller, the SR asset may also be reduced in size and if a default user space is made larger, the SR asset may also be increased in size in a commensurate manner. Similarly, if the orientation of a default user space is changed from facing in a first direction to facing in a second direction, the SR asset may be similarly reoriented.

Figure 5A:
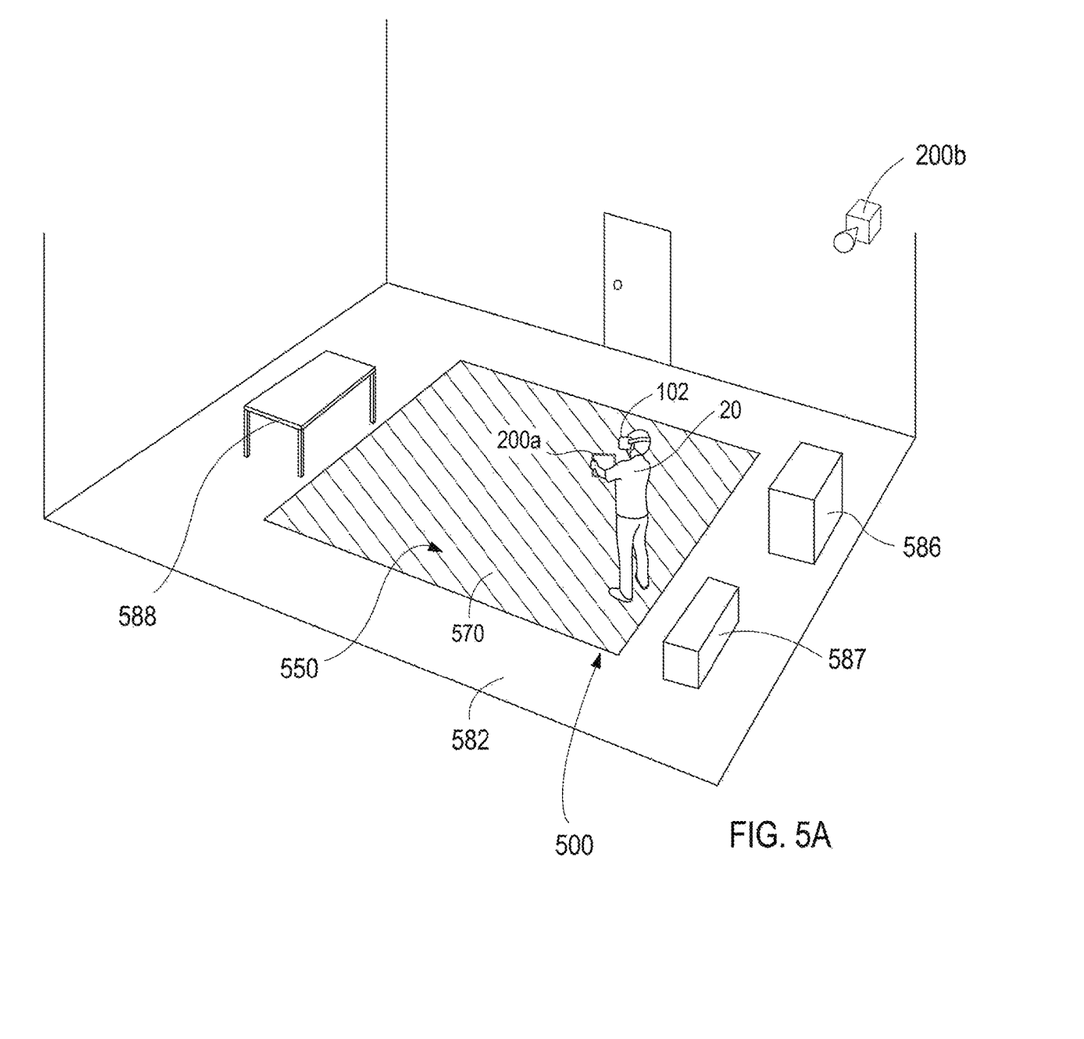
FIG. 5A is a schematic of a simulated reality system with a user space overlaid thereon.
Figure 5B:
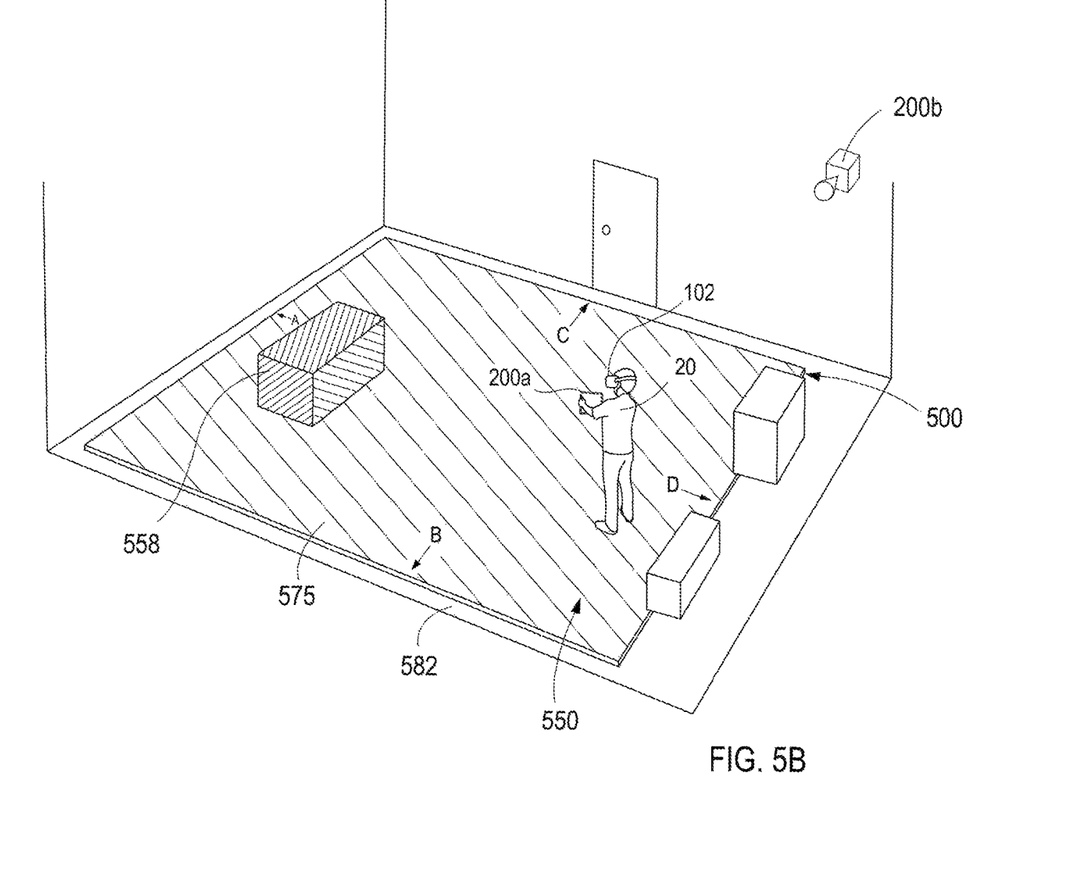
FIG. 5B is a schematic of a simulated reality system with the user space of FIG. 5A asset adjusted thereon.

In some embodiments, the SR assets may also be assets that are mapped to real world features or objects, using the user space (shown in FIGS. 5A and 5B). In such cases, real world features or objects may have corresponding features or objects in the simulated environment. For example, if a user space is created such that it includes certain objects (instead of excluding them from the user space by creating a non-navigable boundary around them), such objects will have corresponding SR assets in the SR layer overlaid over the objects. Such SR assets can indicate to the user that there is a real-world object on which the SR object is overlaid allowing the user to safely navigate the user space without unwanted interaction with the objects. In this manner, an SR layer including SR features (e.g., simulated walls, aisles, etc.) may be overlaid on a physical space having physical or real world features (e.g., walls, aisles, etc.) that correspond to the SR features or assets in a defined spatial relationship.

Figure 4A:
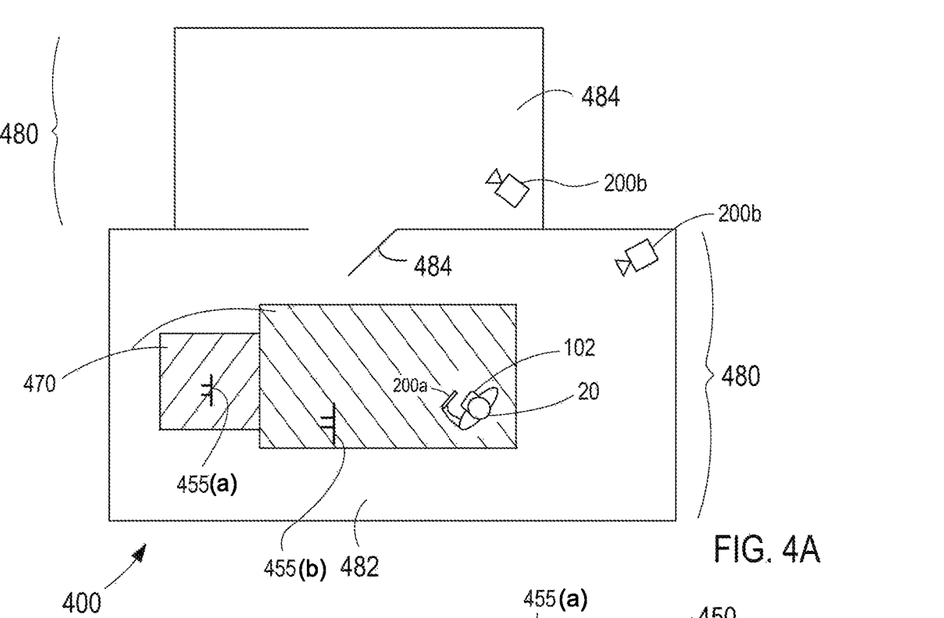
FIG. 4A is a schematic of a simulated reality system with a user space overlaid thereon.
Figure 4B:
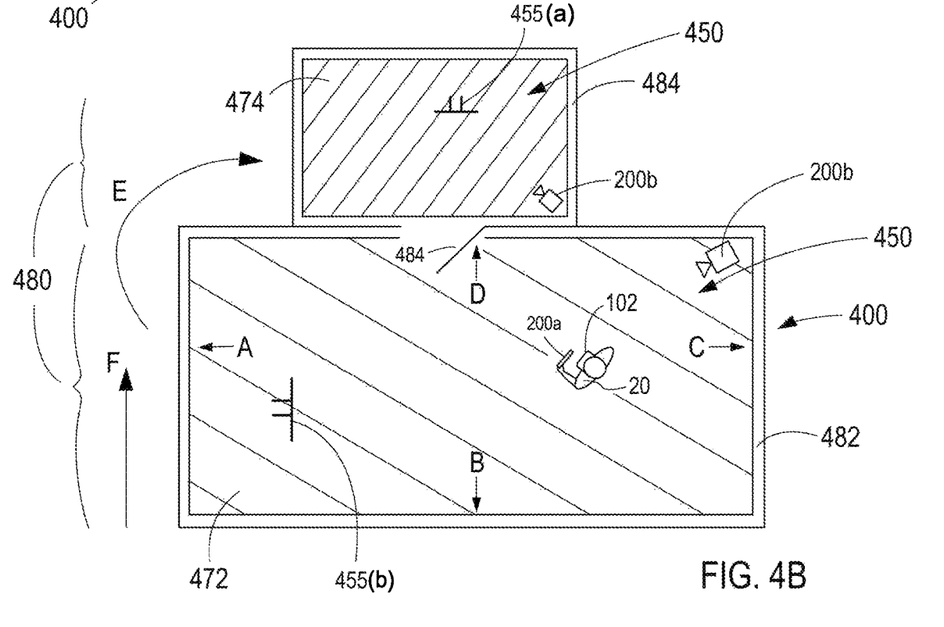
FIG. 4B is a schematic of a simulated reality system with the user space of FIG. 4A rotated thereon.

In several embodiments, an SR asset (e.g., a doorway, a staircase, etc.) may also be positioned to connect two user spaces corresponding to one or more physical spaces (e.g., two rooms) that will be used for the SR environment display (shown in FIGS. 4A and 4B).

With continued reference to FIG. 6, after operation 610, the method 600 proceeds to operation 612 and the SR assets are displayed to the user in an SR environment at their respective determined positions, and relative to user's perspective, such as determined, for example, but the user's assigned position in the SR layer or corresponding position in the physical space.

Optionally, the user space may also be displayed to a user as an SR asset (e.g., simulated markings such as lines, planes, arrows, etc. that indicate to a user the metes and bounds of a user space in an SR environment). Alternatively and/or additionally, information relating to the user space may be provided to a user using, for example, haptic feedbacks, audio feedback, visual feedback, or the like.

In accordance with various embodiments, users can preview their location and reorient themselves with respect to the layout of the SR environment. The user can only navigate within the bounds of the user space while experiencing the SR environment. Once a user's position is calibrated relative to the SR environment, a user may move around the physical environment (within the bounds of the user space) and reposition his or her self-relative to the SR environment, so that it suites the user's needs. For example, a user device of the present system may include internal navigation technology (e.g., a global positioning system). As the user moves around the physical space, the internal navigation technology repositions the user relative to the SR environment. As another example, the user's position relative to the one or more location indicators may be recalculated as the user moves around. As another example, a roaming user may be repositioned relative to the SR environment using simultaneous localization and mapping (SLAM). As yet another example, a roaming user may be repositioned relative to the SR environment using sensor-fusion. This change in positioning of the user may be used to control the SR environment display, as discussed above without computationally and/or data expensive methods of traditional systems that use, for example, computer vision.

The various SR systems disclosed herein tracks the user to render the SR environment in such a way as to allow the user to perceive movement through the environment in response to the user's movements. Any suitable method can be used for determining position of the user. For example, use the marker-based positioning system disclosed in U.S. application Ser. No. 16/856,916, filed Apr. 23, 2020 entitled "Marker-Based Positioning of Simulated Reality," that claims priority to Provisional U.S. Application No. 62/837, 559, filed Apr. 23, 2019, which are hereby incorporated herein by reference in their entirety. Or, the systems can also utilize a secondary positioning system disclosed in the same application. For example, the positioning system may include internal navigation sensors (e.g., optic sensors, wireless internet receivers, inertial measurement units, gyroscopic measurement units, etc.) The roaming user can be repositioned relative to the simulated reality environment using sensor-fusion. As the user moves around the physical space (and away from the marker), the internal navigation technology using a fusion of the one or more sensors repositions the user relative to a first (previously scanned) marker and thus relative to the simulated reality environment. In conjunction with one or more of the navigation sensors, a roaming user may be repositioned relative to the simulated reality environment using simultaneous localization and mapping (SLAM). The SLAM system constructs or updates a map of an unknown environment while simultaneously keeping track of the user location within it. In accordance with various embodiments, the SLAM algorithm is tailored to the available sensors to suitably locate a user. In another example, the system can use the positioning systems disclosed in U.S. application Ser. No. 16/901,830, filed Jun. 15, 2020 entitled "Presenting a Simulated Reality Experience in a Preset Location," that claims priority to Provisional U.S. Application No. 62/861,750, filed Jun. 14, 2019, and which is hereby incorporated herein by reference in its entirety.

As an example, FIGS. 3A-5B show schematic representations of simulated reality systems 300, 400, 500 that can be created and presented according to disclosed systems and methods. It should be appreciated that the embodiments of the systems disclosed herein can include and/or operate with some or all of the components discussed in the examples below. Additionally or alternatively, the embodiments of the systems below can be operated individually of one another or in various combinations with one another.

Figure 3B:
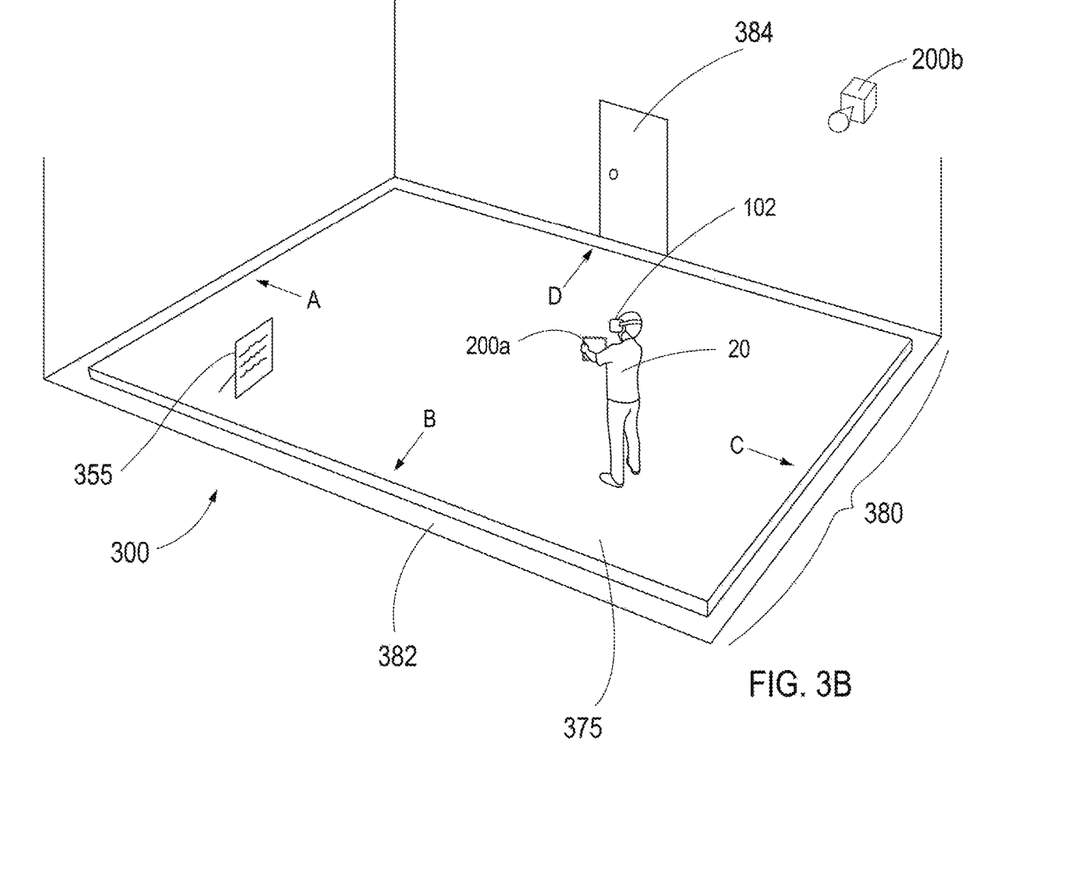
FIG. 3B is a schematic of a simulated reality system with the user space of FIG. 3A scaled thereon.

FIG. 3A illustrates a schematic of a simulated reality system 300 with a user space 370 overlaid on a SR layer (layout of SR assets) defining the SR environment 350. FIG. 3B illustrates a schematic of a simulated reality system 300 with the adjusted user space 375 scaled within the SR environment 350. The simulated reality display system 300 includes a viewing device 102 suitable for displaying a simulated reality SR environment 350. As discussed previously the SR environment 350 is suitable to display SR assets (e.g. asset 355) for users to view via their viewing device 102. In various embodiments, the SR environment displays assets 355 such as the example SR information board (displayed as asset 355 in FIGS. 3A and 3B.)

In accordance with various embodiments, the SR system 300 utilizes a real world layout 380 that allows the SR system 300 to define parameters to adapt the user space 370 to the SR environment. The default user space 370 may be positioned in the real world layout 380 with respect to, for example, the walls of the room 382, the door, 384, etc. Optionally, the default user space 370 may be positioned in the real world layout 380 by first positioning the SR layer with respect to the physical space. The SR system 300 can receive the real world layout 380 such that the system can interpret and/or define the physical features and/or region around the user 20. For example, the real world layout 380 is the meets and bounds of room 382. This can include furniture or other obstacles around the user 20. In one embodiment, the real world layout 380 is received by the system as a digital floorplan of the room 382, as an image of the room 382, as a user input describing the room 382, or the like.

Initially, the SR environment 350 includes the default user space 370. In one embodiment, the default user space 370 is a default size and location (within the SR layer) provided by the system 300. In these various embodiments, the default user space 370 can be any shape or geometry including two dimensional and three-dimensional regions. The system 300 (e.g. processing 152) adjusts or otherwise adapts the default user space 370 to conform to one or more aspects of the real world layout 380. The adjustment or adaptation forms an adjusted user space 375. As shown in FIGS. 3A and 3B, the user space 370 is scaled (e.g. along directions A, B, C, and D) to the adjusted user space 375 (e.g. a larger size as shown) to conform to the size of the room 382. In other examples, the scaling can adjust the shape of the user space 370 in addition to or in the alternative of the size. In this way, the SR system 300 determines a position, size, shape, and/or orientation of the user space 370 relative to the real world layout 380, and then may use the adapted user space 375 to reposition one or more SR assets in the SR environment. The SR system 300 displays the SR environment 350 on the display device 102 allowing the user 20 to move around the adjusted user space 375 to explore the SR environment 350. This allows the user 20 to explore the SR environment 350 with the SR viewer 102 more safely while utilizing more of the real environment 380 e.g. room 382.

The SR system 300 can also assign one or more assets 355 to an SR layer. In adapting the user space 370, the asset 355 can move with the scale of the default user space 370. Therefore, as shown in FIG. 3B the asset 355 moves from an initial position in the SR environment 350 to the shown new position to maintain its fixed positional relationship with the user space. Optionally, the asset 355 may not change its position irrespective of the scaling of default the user space and/or maintain a relative distance to the user or user's avatar.

In some embodiments, the SR system 300 can also include an input device 200. The input device 200 may be suitable to adjust the relationship between the user space and the real world layout 380. In one example, the input device 200 can be a handheld viewing device 200a. In such an example, the handheld viewing device 200a can also function as the viewing device 102 (e.g. in an augmented reality system). In other examples, the input device 200 can be a virtual reality controller. It is contemplated that any suitable input device can be used as the input device 200.

FIG. 4A illustrates a top view schematic of a SR system 400 with a user space 470 overlaid thereon and FIG. 4B is a top view schematic of the SR system of FIG. 4A with the adjusted user space 475 shifted within the SR environment 450. The SR display system 400 includes a viewing device 102 suitable for displaying a simulated reality SR environment 450. As discussed previously the SR environment 450 is suitable to display SR assets (e.g. asset 455) for users to view via their viewing device 102. In various embodiments, the SR environment displays assets 455 such as the example SR information board (displayed as asset 455 in FIGS. 4A and 4B.)

In accordance with various embodiments, the SR system 400 utilizes a real world layout 480. The real world layout 480 allows the SR system 400 to define parameters to adapt the user space 470 to the SR environment. The SR system 400 can receive the real world layout 480 such that the system can interpret and/or define the physical features and/or region around the user 20. For example, the real world layout 480 is the boundary of room 482. In some embodiments, such as the one exemplified in FIGS. 4A and 4B, this can include multiple different rooms e.g. 482 and 484. The SR environment 450 includes the default user space 470. In one embodiment, the default user space 470 is a default arrangement, number, and/or location provided by the system 400 overlaid in a SR layer. In another embodiment, the user space 470 is defined by the user. The user space 470 can be adapted automatically via inputs into the system 400. In these various embodiments, the default user space 470 can be any shape or geometry including, two dimensional and three-dimensional regions. The system 400 (e.g. processing 152) adjusts or otherwise adapts the default user space 470 to conform to one or more aspects of the real world layout 480. In this example, the adjustment or adaptation forms an adjusted user space 472. As shown in FIGS. 4A and 4B, the user space 470 is scaled, shifted, and rotated (e.g. along directions A, B, C, D, E (rotated), and F (shifted)) to form the adjusted user space 472 and/or 474 (e.g. a larger shifted size as shown) to conform to the size of the rooms 482 and 484. While this example, shows all of these forms of reorientation (e.g. scaling, shifting, and rotating in one reorientation), it is also contemplated that each of these can be used individually or in any suitable combination. In other examples, the scaling and/or shifting and/or rotating can adjust the shape and/or location and/or orientation of the user spaces 470 in addition to or in the alternative of the size. In this way, the SR system 400 determines a position, size, shape, and/or orientation of the default user space 470 relative to the real world layout 480 to form user space 472 and 474. The SR system 400 displays the SR environment 450 on the display device 102 allowing the user 20 to move around the adjusted user space 472, 474 to explore the SR environment 450. This allows the user 20 to explore the SR environment 450 with the SR viewer 102 more safely while utilizing more of the real environment 480 e.g. room 482.

In one embodiment, the real world layout 480 may include walls and doors 484 that separate portions of the SR environment 450. This separations (e.g. walls) and connections (e.g. doors) may be received as a part of the floor plan as discussed above. The system 400 can adapt the default user space 470 to include connections or passages at the doors such that the user understands the best or safest access between different portions of the adjusted user space e.g. between 472 and 474. In various embodiments, the system 400 (e.g. processing 152) adjusts connections from default locations and/or sizes to correspond to real world connections (e.g. door way 484). By locating connections between spaces at doorways in the real world layout, the first space 472 and the second space 474 can be safely connected near those doorways.

Like the embodiments discussed above, the real world layout 480 can be received by the system similarly to the processes discussed above with regards to system 300.

The SR system 400 can also assign one or more assets 455(a) and 455(b) to an SR layer. In adapting the user space 470, one or both of the assets 455(a) and 455(b) can move with the scale and/or shift and/or rotation. Specifically, the system can apply adjustments (similar to those made to the default user space 470) to reposition some of the SR assets in the SR environment such that they maintain their position (and/or orientation) with respect to the adapted user space 472 and 474. For example, as shown in FIGS. 4A and 4B, the asset 455(a) is relocated and reoriented (i.e., face up instead of to the left) according to adapted user space 474, while asset 455(b) is only relocated according to user space 472. Alternatively or additionally, the asset 455 can maintain a relative position within the SR layer and/or distance to the user or user's avatar.

Similar to the SR system 300, the SR system 400 can also include an input device 200. The input device 200 may be suitable to adjust the relationship between the user space and the layout of the SR environment 450. In one example, the input device 200 can be a handheld viewing device 200a. In such an example, the handheld viewing device 200a can also function as the viewing device 102 (e.g. in an augmented reality system). In other examples, the input device 200 can be a virtual reality controller. It is contemplated that any suitable input device can be used as the input device 200.

FIG. 5A is a schematic of a simulated reality system 500 with a default user space 570 overlaid thereon and FIG. 5B is a schematic of the simulated reality system 500 of FIG. 5A with the adjusted user space 575 adjusted in the SR environment 550. In the example shown, the real world layout includes obstacles 586, 587, and 588. As shown by way of example, these obstacles include multiple cabinets and a desk located on the interior of the room. While the user space 570 could be limited to avoid these obstacles as shown in FIG. 5A, in other embodiments, the user space can incorporate these obstacles as assets as shown in FIG. 5B. Here, physical feature 588 is converted to asset 558, which is visible in the SR environment. Similar to the systems discussed above, the SR system 500 can also assign assets (e.g. 558) to an SR environment 550. In doing so, the system 500 can locate asset 558 in the location that feature 588 occupied. The asset 558 may be a simulated version of the feature 588. Optionally, a different asset unrelated to the feature 588 where the asset 558 can also be configured or selected to inhibit the user 20 from running into the feature 588 when exploring the VR environment. In some embodiments, the addition of assets can be combined with limitations on the size of space 575. As shown in FIG. 5B, the size of space 575 limits the user from venturing into physical features 586 and 587.

The technology described herein may be implemented as logical operations and/or modules in one or more systems. The logical operations may be implemented as a sequence of processor implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology can be employed in special purpose devices independent of a personal computer.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A simulated reality display system with an adaptable user space, comprising:
   a viewing device suitable for displaying a simulated reality (SR) environment;
   a non-transitory memory containing computer-readable instructions; and
   a processor configured to process the instructions for carrying out the following steps:
      receive a real world layout corresponding to a physical space in which the SR environment will be displayed to the user;
      adapt, using the real world layout, a first default user space to conform to one or more aspects of the physical space forming an adjusted user space;
      reposition one or more assets of an SR layer relative to the adjusted user space, wherein the SR layer defines a layout of a plurality of assets in the SR environment; and
      display the SR environment on the viewing device while allowing the user to safely move around the adjusted user space to explore the SR environment without undesirable interactions with the one or more aspects of the physical space;
   wherein a second default user space is applied and is adaptable within the SR environment that can be safely accessed by a user from the first default user space; and
   wherein the first default user space and the second default user space are adapted by locating doorways in the real world layout and connecting the first default user space and the second default user second space at the doorways.

2. The simulated reality display system of claim 1, further comprising an input device configured to adjust the relationship between the adjusted user space and the layout of the plurality of assets in the SR environment.

3. The simulated reality display system of claim 1, wherein the first default user space is a first space associated with the SR layer.

4. The simulated reality display system of claim 1, wherein the first default user space is modified to conform to one or more aspects of the real world layout to create the adjusted user space.

5. The simulated reality display system of claim 4, wherein the modification includes scaling the first default user space to more closely match the real world layout.

6. The simulated reality display system of claim 5, wherein scaling the first default user space comprises at least one of the following: changing a shape of the first default user space; or changing a size of the first default user space.

7. The simulated reality display system of claim 4, wherein the modification includes reorienting the first default user space to more closely match the real world layout.

8. The simulated reality display system of claim 4, wherein the modification includes relocating the first default user space to more closely match the real world layout.

9. The simulated reality display system of claim 1, wherein the real world layout is received by the simulated reality display system as a digital floorplan.

10. The simulated reality display system of claim 1, wherein the real world layout is received by the simulated reality display system as a camera capture.

11. The simulated reality display system of claim 1, wherein the first default user space is adapted by positioning the first default user space in the physical space and modifying the first default user space to more closely match the real world layout.

12. The simulated reality display system of claim 1, wherein the one or more assets of the SR layer are repositioned relative to the adjusted user space by:
   retrieving positional relationships of each of the one or more assets with respect to the first default user space; and
   assigning the one or more assets to the SR layer while respectively maintaining the positional relationships.

13. The simulated reality display system of claim 1, wherein the one or more assets of the SR layer are repositioned relative to the adjusted user space by:
   identifying at least one object in the physical space that is included within the adjusted user space; and
   positioning a first SR asset at a location of the at least one object in the real world layout.

14. The simulated reality display system of claim 13, wherein the first SR asset is a virtual representation of the at least one object.

15. The simulated reality display system of claim 13, wherein the first SR asset is configured to indicate to the user that the user should avoid the location while navigating the SR environment.

16. The simulated reality display system of claim 1, wherein the connection is selected so that a user can navigate therethrough.

17. A method for presenting simulated reality (SR) with an adaptable user space, the method comprising, by a processor:
   receiving a real world layout corresponding to a physical space in which an SR environment will be displayed to a user;
   adapting, using the real world layout, a default user space to conform to one or more aspects of the physical space forming an adjusted user space;
   reposition one or more assets to an SR layer relative to the adjusted user space, wherein the SR layer defines a layout of a plurality of assets in the SR environment; and
   displaying the SR environment on a display device while allowing the user to safely move around the adjusted user space to explore the SR environment without unsafe interactions with the one or more aspects of the physical space;

wherein a second default user space is applied and is adaptable within the SR environment that can be safely accessed by a user from the first default user space; and wherein the first default user space and the second default user space are adapted by locating doorways in the real world layout and connecting the first default user space and the second default user second space at the doorways.

18. The method of claim 17, wherein the default user space is modified to conform to one or more aspects of the real world layout to create the adjusted user space.

19. The method of claim 18, wherein the modification includes at least one of the following:

scaling the default user space to more closely match the real world layout;

reorienting the default user space to more closely match the real world layout; or relocating the default user space to more closely match the real world layout.

* * * * *